Oct. 5, 1943.　　　　J. S. GORDY　　　　2,331,185
CEMENTING TOOL
Filed May 9, 1940

J. S. GORDY
INVENTOR.

ATTORNEYS

Patented Oct. 5, 1943

2,331,185

UNITED STATES PATENT OFFICE 2,331,185

CEMENTING TOOL

John S. Gordy, Houston, Tex.

Application May 9, 1940, Serial No. 334,127

2 Claims. (Cl. 166—12)

The invention relates to a device for cementing wells wherein the pressure is applied to the liquid cement to force it into the formation until such time as the cement has solidified sufficiently to remain in place.

In the present day practices where a plurality of porous formations have been penetrated by the drilling of a well bore it has been found that these formations, while blocked off temporarily by the filter cake formed on the face of the well bore due to the circulation of the heavy drilling mud, soon releases the liquid or fluid therefrom into the well bore and if this is undesirable fluid then it becomes necessary to permanently block off such formation. The practice has grown up of squeezing cement into such porous formations and this operation is generally known to the trade as a "squeeze job."

In order to perform squeeze jobs of this sort tools have been developed which are generally known as cement retainers which are in the form of packers having a passage therethru which can be anchored in position to resist pressure from below but in every instance known to the present inventor these devices have been equipped with valves of some sort to retain the applied pressure. In other words, a back pressure valve is carried by the tool. The present invention resides in the fact that the present tool is to be used by applying the pressure and holding the pressure on the formation from the surface of the ground and observing the pressure indicators at the surface in order to determine when the pressure may be released and when the tool may be removed. It is therefore one of the objects of the present invention to provide a tool which has no obstructions whatever therein but which can still be set due to the applied pressure.

It is another object of the invention to provide a cement retainer which will set due to the applied pressure as distinguished from being set by manipulation of the retainer itself.

Another object of the invention is to provide a retainer wherein circulation can be had above the retainer if desired or the entire pressure forced into the well can be directed thru the retainer.

Another object of the invention is to provide a retainer carrying a packer wherein the packer is moved to expanded position due to application of liquid pressure thru the tool.

Another object of the invention is to provide a cement retainer having an unobstructed passage therethru so that any variation in pressure in the well below the retainer will be indicated by a similar variation in the pressure at the surface of the well.

Still another object of the invention is to hold the pressure on the cement in a squeeze job operation so that it can be determined whether the formation is being blocked off by observing pressure upon the cement.

Another object of the invention is to apply pressure to a body of cement in a well and to hold such pressure on the cement while observing the pressure gauges with the view of determining when the formation has been blocked by the fact that the pressure on the cement will be lowered if the cement is filtering into the formation; whereas, if the pressure remains constant it will be evident that the cement has blocked the formation and has taken its initial set.

Still another object of the invention is to provide a cement retainer which will afford an indication at the surface as to when the formation is blocked so that the tool can be removed and the well washed out so as to avoid forming a cement plug in the well.

Other and further objects of the invention will be readily apparent when the following description is considered in connection with the accompanying drawing wherein.

Figure 4:
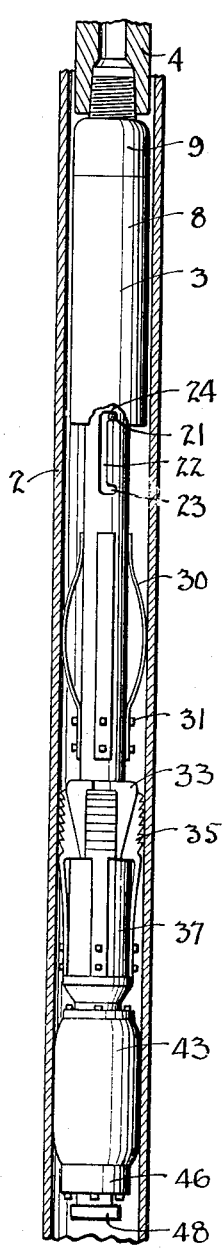
Fig. 4 is a vertical sectional view of a string of pipe in the well with a tool anchored therein.

Fig. 4 shows a string of pipe 2 in the well which may be the well casing, the production string or even a string of tubing thru which it is desired to force a cement slurry into the formation. This pipe is shown in section and has positioned therein the cementing tool or retainer indicated generally at 3. This retainer is arranged to be manipulated by means of a string of pipe 4 known as the operating string. This may be a string of drill pipe or a string of tubing as desired.

Figure 1:
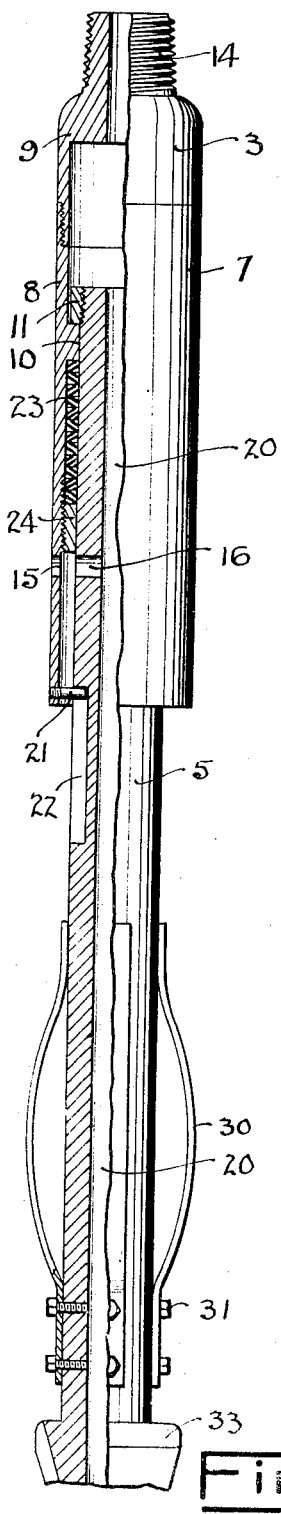
Fig. 1 is a side elevation of the upper end of the tool showing certain parts in section.
Figures 2, 3:
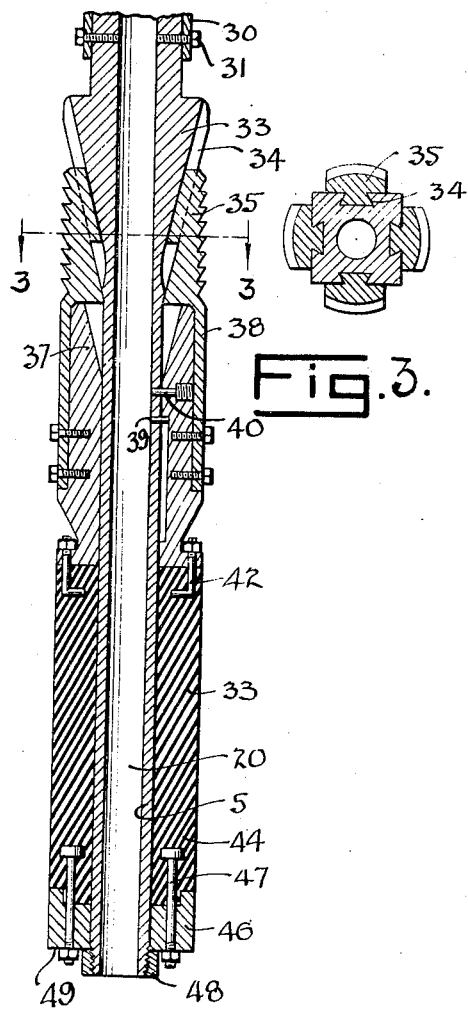
Fig. 2 is a vertical sectional view of the lower portion of the tool being a continuation of the lower end of Fig. 1.
Fig. 3 is a section taken on the line 3—3 of Fig. 2 illustrating the connection of the slips to anchor the device.

The tool 3 is best shown in Figs. 1 and 2 and includes a body or mandrel 5 which is arranged to extend substantially the length of the tool. The upper end of this mandrel has a head 7 telescopically arranged thereon, and the head 7 is made up of a sleeve 8 having a cap 9 threaded thereon. A flange 10 protrudes from the inner wall of sleeve 8 into the interior of the sleeve and limits the upward movement of the head relative to the top of the mandrel by engaging a collar 11 which is threaded onto the upper end of the body 5.

The upper end of the cap 9 is threaded at 14 to receive the operating pipe 4.

The sleeve 8 has a port or passage 15 which is adapted to be aligned with a port or passage 16 in the side of the mandrel 5 when the head is elevated as shown in Fig. 1, in which position some of the liquid flowing downwardly thru the operating pipe and into the central unobstructed opening or passage 20 thru the mandrel will discharge thru these ports into the pipe 2 outside of the tool.

The head 7 is slidably arranged on the mandrel and is held against rotation relative to the mandrel by the pin 21 on the head operating in the slot 22 in the mandrel.

In order to provide a seal between the telescopically connected mandrel and head a series of packing elements 23 are held in position surrounding the mandrel between the gland 24 threadedly connected into the flange 10 on the head so that it is firmly confined. When the head slides downwardly on the mandrel this packing will cover the port 16 in the mandrel and the port 15 will be moved out of alignment therewith so as to close the tool against any discharge from the upper end thereof. This construction is provided so that circulation may be had in the well bore above the tool after it has been set or laterally thru the tool to wash the well either before or after the use of the tool. It may also be used to relieve pressures within the tool and for other purposes as will later develop.

The pin and slot connection is operable in the form of a locking connection as best shown in Fig. 4 wherein the slot 22 has the lateral ends 23 and 24 so that the head 7 may be fixed in either an upper or a lower position. The pin 21 is intended to be of a size such that it will carry the load of the device including the mandrel and packer and any other equipment therebelow. The pin 21 can be moved out of the end slots 23 or 24 by a slight relative rotation of the head with respect to the mandrel.

A series of drag springs 30 are fixed to the mandrel by the bolts 31 and are of such size as to engage the inside surface of the pipe 2 so as to create a frictional drag on the tool as it is lowered into the well. The purpose thereof is to tend to hold the mandrel stationary when pressure is applied thru the tool in order to set the packer as will be next described.

The intermediate portion of mandrel 6, as best shown at the top of Fig. 2, is formed with a downwardly tapered enlargement 33 which has downwardly converging grooves 34 therein, each groove in turn carrying a slip segment or jaw 35. These jaws are slidably arranged on the enlargement 33 so that they may move outwardly and upwardly to engage the inside surface of the pipe and anchor the tool firmly in the well.

Each of the slip segments is attached by means of a spring arm 36 to a fitting 37 which is slidably mounted about the mandrel. These arms normally urge the segments against the enlargement 33 but allow them to move outwardly in the anchoring operation.

A guide pin 39 holds the fitting 37 against relative rotation with respect to the mandrel and a shear pin 40 normally holds the fitting 37 against sliding movement on the mandrel. This fitting 37 is attached by the bolts 42 to the upper end of the packing element 43 which forms the principal part of the packer assembly 44. The lower end of the packing element 43 is confined by a ring 46 which is anchored to the packer by the bolts 47. This ring 46 is slidable on the mandrel 5 but is confined by the collar 48 threaded on the lower end of the mandrel.

From the foregoing it will be seen that the entire packing assembly is slidable on the mandrel but that its upward movement on the mandrel is limited by the movements of the slip segments 35. The movement of these segments against the pipe limits the movement thereof and any pressure applied to the lower exposed surface 49 of the ring 46 will tend to move the packer assembly up. As the slips engage the pipe there will be a tendency to expand the resilient packing element 43 so that it will assume the position shown in Fig. 4 to form a seal on the inside of the pipe 2. The entire tool fits rather snugly within the pipe 2 so that when fluid pressure is forced downwardly through the operating string thru the passage 20 in the tool and into the well below the tool, this fluid pressure builds up in the well and exerts pressure against the exposed surface 49 on the bottom of the packer and causes the packer to set. It is intended that the shear pin 40 will be of a size such that it can be sheared by a predetermined pressure so that the device will remain collapsed while it is being lowered into the well but can be anchored or set by applying a predetermined pressure to the well.

Particular attention is directed to the fact that there is no obstruction whatever in the passage 20 thru the tool. This construction has been provided so that when the cement is pumped into the well and forced into the formation, the pressure gauges at the surface will indicate the applied pressure. Where a porous formation is encountered the cement is usually forced into the formation. As the cement filters or leaks into the formation the applied pressure will drop and this drop will be indicated on the pressure gauges because of the fact that the passage 20 is entirely unobstructed. It might be noted that with previous devices back pressure valves have been provided which were arranged to close upon the dropping off of the pressure so that any indication at the surface was prevented; whereas, with the present tool the pressure drop is apparent at the surface and indicates to the operator that the formation is still taking cement. He can then increase his pressure and apply more cement. On the other hand if the pressure gauge or indicator shows that there is no drop in the applied pressure then the operator is aware of the fact that the formation has been blocked off and that the cement is probably taking its initial set. This information is of particular advantage to the operator because as soon as the cement takes its initial set the formation will be blocked and the operator can then proceed to remove the tool from the well.

With the prior devices it has been impossible to determine when the cement has set because in operation any pressure was not apparent at the surface but with the present tool when the operator determines that his cement is properly positioned he can immediately proceed to either remove the tool to or wash out the remaining cement. The head 7 can be raised or lowered as desired to discharge washing liquid from the ports 15 and 16, to wash out around the tool and facilitate its removal, or the ports 15 and 16 can be closed, the operating string 4 raised somewhat to release the slips 35 and washing liquid forced downwardly thru the opening 20 to remove any cement inside of the tool. By manipulating the operating string 4 and positioning the pin 21 in one or the other of the ends 23 or 24 of the slot 22, the operator may raise or lower the entire tool if desired and wash out any cement remaining in the well or the pipe 2 below the tool. In this manner no cement plug need be formed inside of the well unless desired. This is of advantage because after the formation has been blocked and the well is to be placed on production from a lower formation, it is necessary to drill out the plug of cement which has heretofore remained in the well; whereas, with the present tool the cement may be washed out prior to taking its initial set and in this manner the well is ready for production in a very short period of time and additional trips into the well with drilling tools for cleaning out the well may be unnecessary.

Broadly the invention contemplates a cementing tool thru which pressure may be applied to the formation and particularly wherein the procedure occurring in the bottom of the well will be indicated at the surface due to the fact that the tool has an unobstructed passage therethru and wherein also circulation may be had thru the tool while the tool is anchored by the applied pressure.

What is claimed is:

1. A well cementing device including a tubular stem, a hollow mandrel, a telescopic engagement between said stem and said mandrel, a locking slot and pin connection to hold said stem and mandrel releasably against relative longitudnal movement, a downwardly tapered head on said mandrel, a packer adapted to fit closely in the well mounted slidably on said mandrel at the lower end thereof, a sleeve supported on said packer, slips associated with said sleeve and fitting upon said tapered head, said mandrel having an entirely unobstructed passage therethrough whereby pressure fluid forced downwardly therethrough may move said packer upwardly to set said slips and expand said packer.

2. A well tool including an operating string of pipe, a tubular head connected to the lower end of said string of pipe, a mandrel telescopically connected to said head, an unobstructed passage in said mandrel to conduct liquid under pressure therethru, a packer carried by said mandrel and adapted to be expanded by liquid under pressure passing thru said mandrel to below said tool, means to anchor the top of said packer against movement due to such pressure, a discharge port in said mandrel above said packer to circulate fluid from within to without said tool above the packer, and a port in said head arranged to register with said mandrel port when in one position, said head being adapted for movement relative to said port in said mandrel to open and close said port in said mandrel.

JOHN S. GORDY